United States Patent
Wolfram et al.

(10) Patent No.: US 9,734,252 B2
(45) Date of Patent: Aug. 15, 2017

(54) METHOD AND SYSTEM FOR ANALYZING DATA USING A QUERY ANSWERING SYSTEM

(75) Inventors: Stephen Wolfram, Concord, MA (US); Wiktor Macura, New York City, NY (US); Michael Pilat, Chicago, IL (US)

(73) Assignee: Wolfram Alpha LLC, Champaign, IL (US)

( * ) Notice: Subject to any disclaimer, the term of this patent is extended or adjusted under 35 U.S.C. 154(b) by 834 days.

(21) Appl. No.: 13/608,817

(22) Filed: Sep. 10, 2012

(65) Prior Publication Data

US 2013/0166530 A1 Jun. 27, 2013

Related U.S. Application Data

(60) Provisional application No. 61/532,548, filed on Sep. 8, 2011.

(51) Int. Cl.
*G06F 7/00* (2006.01)
*G06F 17/30* (2006.01)

(52) U.S. Cl.
CPC .. *G06F 17/30873* (2013.01); *G06F 17/30684* (2013.01)

(58) Field of Classification Search
CPC ......... G06F 17/30873; G06F 17/30684; G06F 17/30663
USPC ........................................ 707/706, 708, 748
See application file for complete search history.

(56) References Cited

U.S. PATENT DOCUMENTS

| | | | |
|---|---|---|---|
| 4,734,854 A | 3/1988 | Afshar |
| 4,740,886 A | 4/1988 | Tanifuji et al. |
| 4,841,441 A | 6/1989 | Nixon et al. |
| 4,949,253 A | 8/1990 | Chigira et al. |
| 5,038,296 A | 8/1991 | Sano |
| 5,315,710 A | 5/1994 | Kishimoto et al. |
| 5,394,509 A | 2/1995 | Winston |
| 5,434,777 A | 7/1995 | Luciw |
| 5,448,740 A | 9/1995 | Kiri et al. |
| 5,485,601 A | 1/1996 | Ching |

(Continued)

FOREIGN PATENT DOCUMENTS

| | | |
|---|---|---|
| EP | 0 442 240 A2 | 8/1991 |
| WO | WO-97/40425 A2 | 10/1997 |

(Continued)

OTHER PUBLICATIONS

"AppleScript," Wikipedia.

(Continued)

*Primary Examiner* — Md. I Uddin

(57) ABSTRACT

A natural language query answering system includes an external data pre-processor configured to i) analyze a first data set, the first data set received via a communication network, to identify data in the first data set that corresponds to entities in a database comprising categorized entities, and ii) generate a second data set corresponding to the first data set and based on the analysis of the first data set, wherein the second data set includes information indicating how data in the second data set is to be interpreted by the natural language query answering system. The natural language query answering system is configured to retrieve data and/or process data from the second data set in response to natural language queries.

23 Claims, 4 Drawing Sheets

(56) References Cited

U.S. PATENT DOCUMENTS

| | | | |
|---|---|---|---|
| 5,499,371 A | 3/1996 | Henninger et al. | |
| 5,555,367 A | 9/1996 | Premerlani et al. | |
| 5,559,939 A | 9/1996 | Wada et al. | |
| 5,634,024 A | 5/1997 | Yamaguchi | |
| 5,640,576 A | 6/1997 | Kobayashi et al. | |
| 5,696,962 A | 12/1997 | Kupiec | |
| 5,768,590 A | 6/1998 | Kimura et al. | |
| 5,815,713 A | 9/1998 | Sanders | |
| 5,815,717 A | 9/1998 | Stack | |
| 5,987,505 A | 11/1999 | Fry et al. | |
| 6,038,560 A | 3/2000 | Wical | |
| 6,076,051 A | 6/2000 | Messerly et al. | |
| 6,084,585 A | 7/2000 | Kraft et al. | |
| 6,144,989 A | 11/2000 | Hodjat et al. | |
| 6,169,986 B1 | 1/2001 | Bowman et al. | |
| 6,173,441 B1 | 1/2001 | Klein | |
| 6,216,139 B1 | 4/2001 | Listou | |
| 6,256,665 B1 | 7/2001 | Fry et al. | |
| 6,275,976 B1 | 8/2001 | Scandura | |
| 6,289,513 B1 | 9/2001 | Bentwich | |
| 6,493,694 B1 | 12/2002 | Xu et al. | |
| 6,502,236 B1 | 12/2002 | Allen et al. | |
| 6,505,157 B1 | 1/2003 | Elworthy | |
| 6,519,585 B1 | 2/2003 | Kohli | |
| 6,584,464 B1 | 6/2003 | Warthen | |
| 6,589,290 B1 | 7/2003 | Maxwell et al. | |
| 6,675,159 B1 | 1/2004 | Lin et al. | |
| 6,684,388 B1 | 1/2004 | Gupta et al. | |
| 6,704,728 B1 | 3/2004 | Chang et al. | |
| 6,742,162 B2 | 5/2004 | Bennett | |
| 6,845,354 B1 | 1/2005 | Kuo et al. | |
| 6,876,314 B1 | 4/2005 | Lin | |
| 6,877,155 B1 | 4/2005 | Lindsey | |
| 6,901,399 B1 | 5/2005 | Corston et al. | |
| 6,973,640 B2 | 12/2005 | Little et al. | |
| 6,996,801 B2 | 2/2006 | Yoneyama | |
| 7,120,574 B2 | 10/2006 | Troyanova et al. | |
| 7,137,100 B2 | 11/2006 | Iborra et al. | |
| 7,197,739 B2 | 3/2007 | Preston et al. | |
| 7,222,333 B1 | 5/2007 | Mor et al. | |
| 7,231,343 B1 | 6/2007 | Treadgold et al. | |
| 7,263,517 B2 | 8/2007 | Sheu et al. | |
| 7,269,822 B2 | 9/2007 | Gebhart et al. | |
| 7,373,291 B2 | 5/2008 | Garst | |
| 7,403,938 B2 | 7/2008 | Harrison et al. | |
| 7,440,968 B1 | 10/2008 | Oztekin et al. | |
| 7,451,135 B2 | 11/2008 | Goldman et al. | |
| 7,454,701 B2 | 11/2008 | Graeber | |
| 7,613,676 B2 | 11/2009 | Baisley et al. | |
| 7,620,935 B2 | 11/2009 | Baisley et al. | |
| 7,685,507 B2 | 3/2010 | Workman et al. | |
| 7,747,601 B2 | 6/2010 | Cooper et al. | |
| 7,844,594 B1 | 11/2010 | Holt et al. | |
| 7,870,147 B2 | 1/2011 | Bailey et al. | |
| 7,895,221 B2 | 2/2011 | Colledge et al. | |
| 8,091,024 B2 | 1/2012 | Graeber | |
| 8,135,696 B2 | 3/2012 | Safoutin | |
| 8,185,523 B2 | 5/2012 | Lu et al. | |
| 8,788,524 B1 | 7/2014 | Wolfram et al. | |
| 9,213,768 B1 | 12/2015 | Wolfram et al. | |
| 2002/0059204 A1* | 5/2002 | Harris | G06F 17/3043 |
| 2002/0099743 A1 | 7/2002 | Workman et al. | |
| 2002/0116176 A1 | 8/2002 | Tsourikov et al. | |
| 2002/0140734 A1 | 10/2002 | Bennett | |
| 2002/0143810 A1 | 10/2002 | Bennett | |
| 2002/0174120 A1 | 11/2002 | Zhang et al. | |
| 2002/0188586 A1 | 12/2002 | Veale | |
| 2003/0145022 A1 | 7/2003 | Dingley | |
| 2003/0191765 A1 | 10/2003 | Bargh et al. | |
| 2004/0001109 A1 | 1/2004 | Blancett et al. | |
| 2004/0049499 A1 | 3/2004 | Nomoto et al. | |
| 2004/0088158 A1 | 5/2004 | Sheu et al. | |
| 2004/0103405 A1 | 5/2004 | Vargas | |
| 2004/0128649 A1 | 7/2004 | Grundy et al. | |
| 2005/0005258 A1 | 1/2005 | Bhogal et al. | |
| 2005/0080780 A1 | 4/2005 | Colledge et al. | |
| 2005/0097464 A1 | 5/2005 | Graeber | |
| 2006/0020886 A1 | 1/2006 | Agrawal et al. | |
| 2006/0025987 A1 | 2/2006 | Baisley et al. | |
| 2006/0026576 A1 | 2/2006 | Baisley et al. | |
| 2006/0074881 A1* | 4/2006 | Vembu | G06F 17/30545 |
| 2006/0136411 A1 | 6/2006 | Meyerzon et al. | |
| 2006/0190439 A1 | 8/2006 | Chowdhury et al. | |
| 2006/0271908 A1 | 11/2006 | Bargh et al. | |
| 2006/0279799 A1 | 12/2006 | Goldman | |
| 2007/0022109 A1 | 1/2007 | Imielinski et al. | |
| 2007/0043574 A1 | 2/2007 | Coffman et al. | |
| 2007/0106657 A1 | 5/2007 | Brzeski et al. | |
| 2007/0106659 A1 | 5/2007 | Lu et al. | |
| 2007/0156516 A1 | 7/2007 | Moissinac et al. | |
| 2007/0203929 A1 | 8/2007 | Bolivar | |
| 2007/0208722 A1 | 9/2007 | Dettinger et al. | |
| 2007/0220034 A1 | 9/2007 | Iyer et al. | |
| 2007/0282811 A1 | 12/2007 | Musgrove | |
| 2008/0016040 A1 | 1/2008 | Jones et al. | |
| 2008/0066052 A1 | 3/2008 | Wolfram | |
| 2008/0082501 A1 | 4/2008 | Hardy | |
| 2008/0189284 A1* | 8/2008 | Vanasco | G06F 21/10 |
| 2009/0055733 A1 | 2/2009 | Graeber | |
| 2009/0171923 A1 | 7/2009 | Nash et al. | |
| 2010/0004924 A1 | 1/2010 | Paez | |
| 2010/0191740 A1 | 7/2010 | Lu et al. | |
| 2010/0205198 A1 | 8/2010 | Mishne et al. | |
| 2010/0293174 A1 | 11/2010 | Bennett et al. | |
| 2012/0136649 A1* | 5/2012 | Freising | G06F 17/30663 704/9 |

FOREIGN PATENT DOCUMENTS

| | | |
|---|---|---|
| WO | WO-2006/014892 A2 | 2/2006 |
| WO | WO-2006/015006 A2 | 2/2006 |

OTHER PUBLICATIONS

"Area calculator", http://www.calculator.com 1 page, Aug. 15, 2006.

"calculator.com", http://www.calculator.com, 2 pages, Aug. 15, 2006.

"Car Lease Calculator", http://www.calculator.com, 1 page, Aug. 15, 2006.

"Currency Calculator", http://www.calculator.com, 1 page, Aug. 15, 2006.

"Fractions calculator", http://www.calculator.com, 1 page, Aug. 15, 2006.

"General Loan Calculator", http://www.calculator.com, 1 page, Aug. 15, 2006.

"Google Code," http://code.google,com/ , Mar. 17, 2005, p. 1-11.

"Graphing calculator", http://www.calculator.com, 1 page, Aug. 15, 2006.

"Home—Finance", http://www.calculator.com, 2 pages, Aug. 15, 2006.

"Home Equity Calculator", http://www.calculator.com, 1 page, Aug. 15, 2006.

"How Much Can I Afford Calculator", http://www.calculator.com, 1 page, Aug. 15, 2006.

Jones et al., "Generating Query Substitutions," WWW May 23-26, 2006, Edinburgh, Scotland, pp. 387-396.

"Length Adding Calculator", http://www.calculator.com, 1 page, Aug. 15, 2006.

"Love Calculator", http://www.calculator.com, 1 page, Aug. 15, 2006.

"Mortgage Payment Calculator", http://www.calculator.com, 1 page, Aug. 15, 2006.

"Mortgage Qualification Calculator", http://www.calculator.com, 1 page, Aug. 15, 2006.

"Percent calculator", http://www.calculator.com, 1 page, Aug. 15, 2006.

"Rent versus Buy Calculator", http://www.calculator.com, 1 page, Aug. 15, 2006.

(56) References Cited

OTHER PUBLICATIONS

"Scientific calculator", http://www.calculator.com, 1 page, Aug. 15, 2006.
"Standard calculator", http://www.calculator.com, 1 page, Aug. 15, 2006.
"Temperature calculator", http://www.calculator.com, 1 page, Aug. 15, 2006.
"The Mortgage Calculator," http://www.hughchou.org/calc/mortold.html Aug. 8, 1996, p. 1-7.
"Time Calculator", http://www.calculator.com, 1 page, Aug. 15, 2006.
"Unit Conversion Calculator", http://www.calculator.com, 1 page, Aug. 15, 2006.
Adorni, et al., "Natural Language Input for Scene Generation," Proceedings of the first conference on European Chapter of the Association for Computational Linguistics, pp. 175-182 (1983).
Asperti et al., "A content based mathematical search engine: Whelp," 2004, p. 1-15.
Estival et al., "Towards Ontology-Based Natural Language Processing," http://acl.ldc.upenn.edu/acl2004/nlpxml/pdf/estival-etal.pdf, accessed Mar. 8, 2010, 8 pages.
Kamareddine et al., "Restoring Natural Language as a Computerized Mathematics Input Method," Proceedings of the 14th symposium on Towards Mechanized +Mathematical Assistants: 6th International Conference, pp. 280-295 (2007).
Ko et al., "The State of the Art in End-User Software Engineering," accepted for publication in ACM Computing Surveys.
Lavrov, "Program Synthesis," Cybernetics and Systems Analysis, vol. 18, No. 6 pp. 708-715 (Nov. 1982).
Meyers, A., "VOX—An Extensible Natural Language Processor," http://dli.iiit.ac.in/ijcai/IJCAI-85-VOL2/PDF/026.pdf, accessed Mar. 8, 2010, 5 pages.
Moore, Gregory M., "Calculator Code: Programming Code for Use within a Scientific Calculator," Fall 2005, p. 1-29.
Myers et al., "Natural Programming Languages and Environments," Communications of the ACM, vol. 47, No. 9, pp. 47-52 (Sep. 2004).
Office Action for related U.S. Appl. No. 12/780,685, dated Feb. 15, 2012.
Office Action for related U.S. Appl. No. 12/780,705, dated Jan. 31, 2012.
Osogami, "A Study of Input and Output Conditions for Automatic Program Generation," Memoirs of the Fukui Institute of Technology, vol. 37 pp. 273-278 (2007).
Sucan, Ioan Alexandru, "A Search Engine for Mathematical Formulae," May 7, 2006, p. 1-17.
Trott, Michael, "Mathematical Searching of the Wolfram Functions Site," 2005, The Mathematica Journal, p. 713-726.
Trott, Michael, "The Functions Website," 2003, The Mathematical Journal, p. 1-10.
Wang et al., "Mining Term Association Patterns from Search Logs for Effective Query Reformulation," ACM CIKM 2008, Oct. 26-30, 2008, pp. 479-488.
"Microsoft Computer Dictionary," Microsoft Press, 5th ed., p. 452 (2002).
Office Action in U.S. Appl. No. 12/780,685, dated Aug. 16, 2012.
Office Action in U.S. Appl. No. 12/780,685, dated Jan. 2, 2014.
Office Action in U.S. Appl. No. 12/780,685, dated Jun. 16, 2014.
Office Action in U.S. Appl. No. 12/780,685, dated Jan. 5, 2015.
Office Action in U.S. Appl. No. 12/780,705, dated Aug. 16, 2012.
Office Action in U.S. Appl. No. 12/780,705, dated Jan. 2, 2014.
Notice of Allowance for U.S. Appl. No. 12/780,705, dated Jun. 4, 2014.
Notice of Allowance for U.S. Appl. No. 12/780,685, dated Aug. 5, 2015.

* cited by examiner

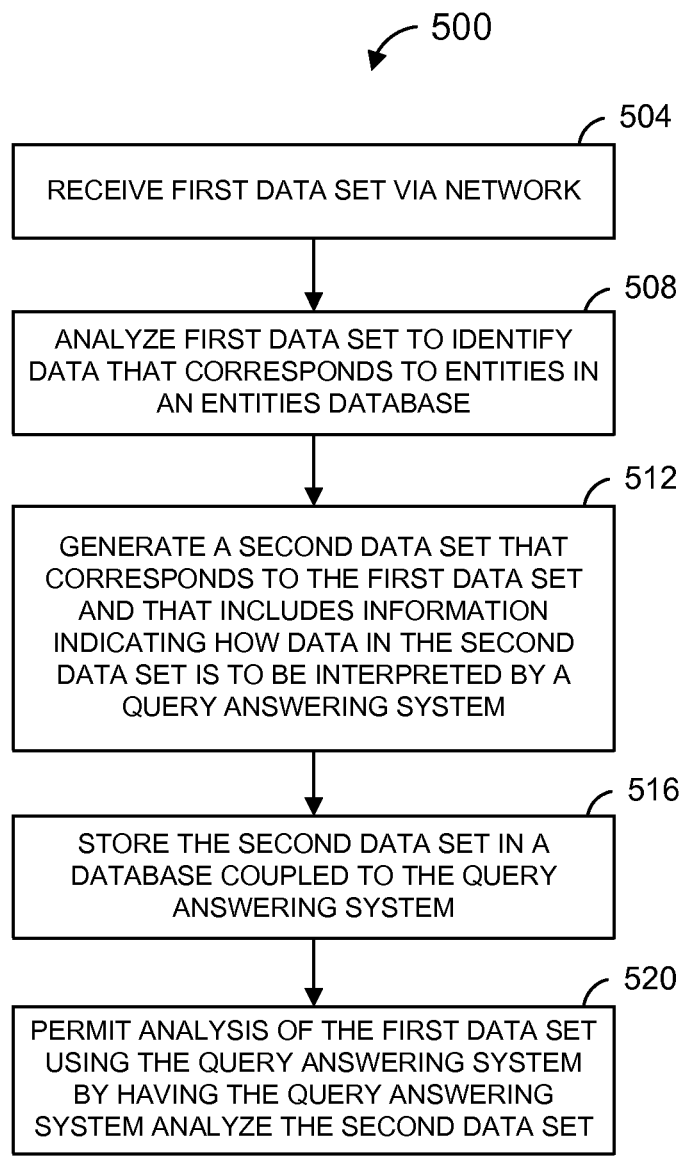

METHOD AND SYSTEM FOR ANALYZING DATA USING A QUERY ANSWERING SYSTEM

CROSS-REFERENCE TO RELATED APPLICATION

This application claims the benefit of U.S. Provisional Application No. 61/532,548, filed Sep. 8, 2011, entitled "Method and System for Analyzing Data Using a Query Answering System," which is hereby incorporated by reference herein in its entirety.

BACKGROUND

Search engines, such as Internet search engines, have been in use for some time. Such search engines permit the user to form a search query using combinations of keywords to search through a web page database containing text indices associated with one or more distinct web pages. The search engine looks for matches between the search query and text indices in the web page database, and then returns a number of hits which correspond to URL pointers and text excerpts from the web pages that represent the closest matches.

Some Internet search engines attempt to detect when a user has entered a query incorrectly. For example, a prominent search engine employs a "Did you mean . . . ?" feature that essentially runs a spellchecker on user queries. The spellchecker attempts to detect when an entered word is misspelled by checking it against a database of common words and their misspellings. When a possible misspelling is detected, the search engine may provide to the user a prompt to invoke an alternative query in which the misspelled word is spelled correctly.

Cyc, an artificial intelligence project for building a knowledge base, provides a response feature for queries it cannot answer. A knowledge base of Cyc uses an extensive ontology that provides relationships between entities. "A town contains houses" and "a car can drive on roads" are examples of relationships coded into the ontology. When a user submits a query asking a question that Cyc can't answer, for example, "can a car drive on a handrail?" Cyc will provide to the user the closest set of inferences it has made in attempting to answer the query, such as "a car can drive on roads." These responses thus merely show inferences made by the inference system.

Some application programs, for example, a word processor, may have a help tool that allows a user to enter a word or phrase and will display help topics containing that word or phrase, from which the user can make a selection.

SUMMARY OF THE DISCLOSURE

In one embodiment, a method includes receiving a first data set via a communication network, and analyzing the first data set to identify data in the first data set that corresponds to entities in a database comprising categorized entities. The method also includes generating a second data set corresponding to the first data set and based on the analysis of the first data set, wherein the second data set includes information indicating how data in the second data set is to be interpreted by a natural language query answering system. The method additionally includes storing the second data set in a database communicatively coupled to the natural language query answering system, and permitting analysis of the first data set using the natural language query answering system by having the natural language query answering system analyze the second data set.

In another embodiment, a tangible computer readable storage medium has stored thereon machine executable instructions. The machine executable instructions, when executed by one or machines, cause the one or more machines to analyze a first data set, the first data set received via a communication network, to identify data in the first data set that corresponds to entities in a database comprising categorized entities; generate a second data set corresponding to the first data set and based on the analysis of the first data set, wherein the second data set includes information indicating how data in the second data set is to be interpreted by a natural language query answering system; store the second data set in a database communicatively coupled to the natural language query answering system; and permit analysis of the first data set using the natural language query answering system by having the natural language query answering system analyze the second data set.

In yet another embodiment, a system comprises a natural language query answering system including an external data pre-processor. The external data pre-processor is configured to i) analyze a first data set, the first data set received via a communication network, to identify data in the first data set that corresponds to entities in a database comprising categorized entities, and ii) generate a second data set corresponding to the first data set and based on the analysis of the first data set, wherein the second data set includes information indicating how data in the second data set is to be interpreted by the natural language query answering system. The natural language query answering system is configured to retrieve data and/or process data from the second data set in response to natural language queries.

BRIEF DESCRIPTION OF THE DRAWINGS

FIG. 5 is a flow diagram of an example method that may be implemented by the system of FIG. 1.

DETAILED DESCRIPTION

Embodiments described herein may be utilized in a system for parsing queries from users and generating answer outputs. The system may include a curated entities database that stores categorized information regarding entities, such as attributes of the entities. In embodiments described herein, a system permits external data to be analyzed by the system in light of curated entities database.

Figure 1:
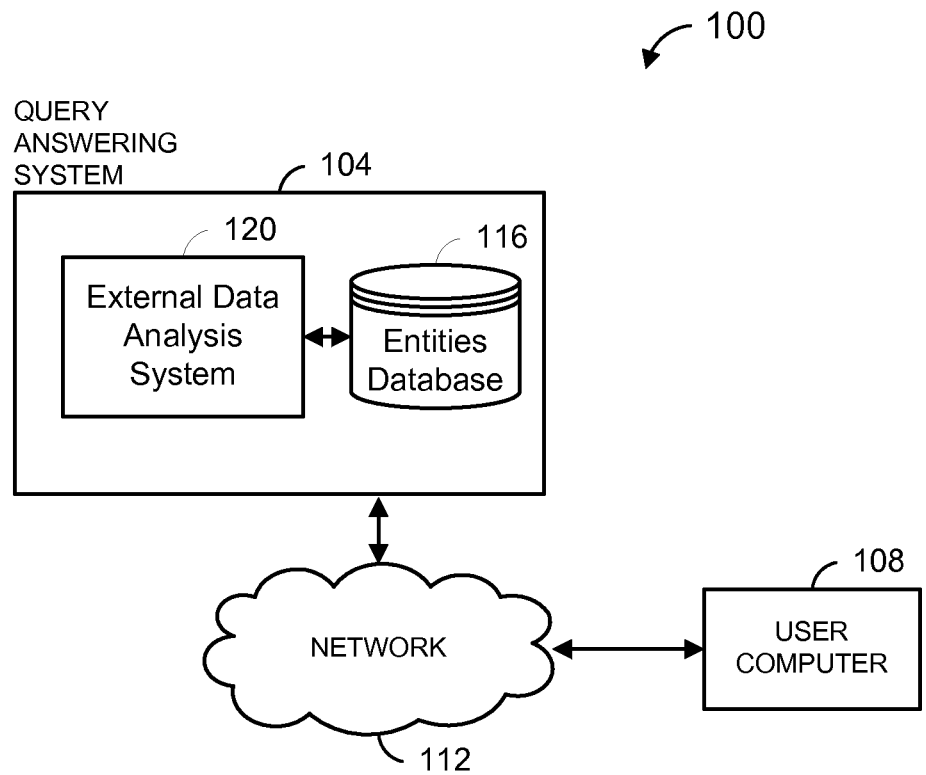
FIG. 1 is a block diagram of an example system for answering queries in an imprecise syntax.

FIG. 1 is block diagram of an example system 100 that includes a query answering system 104 for answering queries in imprecise syntax (e.g., natural language queries), according to an embodiment. The query answering system 104 generates answers to queries as opposed to merely providing links to web pages having words that match words in the query. In other words, the query answering system 104 attempts to understand the meaning of the query and then provides an answer to the query based on the understood meaning. For example, in response to the query "manhattan", the query answering system 104 may determine that "manhattan" can refer to various entities such as the city in New York, various other cities in the United States, the movie "Manhattan", etc. The different entities correspond to different assumptions regarding the meaning of the word "manhattan". The query answering system 104 may then chooses one of assumptions, i.e., chooses an entity, and determines information about the entity to formulate an answer. The information may be retrieved from a database of the query answering system 104 or a database communicatively coupled to the query answering system 104. The determined information is then returned and provided by the query answering system 104 in response to the query.

The system 100 includes a user computer 108 coupled to the query answering system 104 via a communications network 112. The communications network 112 may include one or more of a local area network (LAN), a wireless LAN, a wide area network (WAN), a mobile communications network, the Internet, etc.

A user enters a query via the user computer 108. For example, the user may enter a query via a web page or other display that is displayed on a display device of the user computer 108. The user computer 108 then transmits the query to the query answering system 104 via the network. In an embodiment, the query answering system 104 is implemented on a computer system including one or more computing devices such as a server, a workstation, a mainframe, etc. The query answering system 104 may be a system similar to query answering systems described in U.S. patent application Ser. No. 12/780,685, entitled "Assumption Mechanism for Queries," filed on May 14, 2010, or another suitable system. The user computer 108, in various embodiments, is a personal computer, a tablet computer, a smart phone, a personal digital assistant (PDA), etc. Each of the device 104 and the device 108 include respective network interfaces to transmit and receive data via the network 112.

An answer to the query is transmitted by the answering system 104 via the network 112. The answer may be included in a web page or other suitable display, which is displayed on the display device of the user computer 108.

In an embodiment, the answering system 104 receives a query in an imprecise syntax from the user computer 108, via the network 112, the query including a word, phrase, or group of textual characters. At least in some scenarios, the answering system 104 determines a plurality of meanings or senses of the word, phrase, or group of textual characters based on data stored in an entities database 116, and chooses one meaning or sense. The answering system 104 then generates an answer to the query based on the one meaning or sense.

Entities that correspond to the word may be determined. For example, the entities database 116 may be queried with the word. The entities database 116 may include categorized entities such as geographical entities, people, companies, etc. The entities database 116 optionally may include attributes of the entities. Query results from the entities database 116 may include an entity as well as an indication of a category to which the entity belongs. Optionally, the query results from the entities database 116 may include attributes corresponding to the entity.

In one embodiment, entities in a same category will have a common set of attributes, and different categories may have different sets of attributes. For example, one category may be cities, and example attributes for the cities category may include one or more of population, area, etc. Another example of a category may be movies, and example attributes for the movies category may include one or more of box office gross, how recently it was released, etc. Yet another example of a category may be universities, and example attributes for the universities category may include one or more of enrollment numbers, a rank number in a well known published survey, etc.

Rankings may be determined based on these attributes. For example the word "Manhattan" may refer, among other things, to either "Manhattan, N.Y." or "Manhattan, Ill." Manhattan, N.Y. will be ranked higher than Manhattan, Ill. with respect to the attribute population. In this way, like entities may be compared based on common criteria, and one will rank higher than the other. The attributes utilized to determine the rankings may be retrieved from the entities database 116 or from some other database, for example.

Rankings of meanings and/or senses of the word may be determined based on user attributes, in an embodiment. The attributes of the user may be determined in a variety of ways. In a website implementation, user information may be obtained from observing user browsing activity, cookies, etc., while the user interacts with the website. It may be gathered and used on the fly, rather than pre-generated. Such information may include an indication of the user's geographical location, or GeoIP location. The GeoIP location, in turn, yields information such as the time zone the user is in, the currency of the user's country, and the dominant language spoken in the user's area. The user's location may be used to judge distances or likelihoods that entities will be familiar or foreign to that user. For example, the term "Independence Day" in a query may refer to any of a hundred Independence Days throughout the world. But rankings of the different Independence Days may be generated based on a geographical location of the user. For example, if the user is located in the United States, the sense of "Independence Day" referring to July 4 may be ranked high.

Continuing with this example, if the user's country does not have an Independence Day, then another country that does may be logically linked to or associated with the user's country. For instance, San Marino does not have an Independence Day, but it is a landlocked enclave which is completely surrounded by Italy, which does have an Independence Day. Such hard-coded relationships between entities also may be used to further disambiguate words.

Disambiguating certain formatting conventions of queries, such as the preferred date format, can depend on the user's Gear' location as well. While Europe uses a day/month format, the United States uses a month/day format. The user's location may thus provide information so that one date format may be ranked higher than another.

In one embodiment, customized user attribute information may be used. If the user chooses different entities than the default assumption, then a profile may develop linking the user to those choices. By this method, the system can learn and remember which specific assumptions to make to a particular user. In another embodiment, a user may voluntarily supply attributes in response to prompts, for example. For example, may choose to maintain a profile with a website.

In an embodiment, the user computer 108 transmits, via the network 112, a query in an imprecise syntax, the query including a word having multiple meanings or senses. In response, the user computer 108 receives from the answering system 104, via the network 112, query results that are based on a first meaning or sense of the word. Additionally, the user computer 108 receives from the answering system 104, via the network 112, an indication of the first meaning or sense of the word (as assumed by the answering system 104). The user computer 108 displays the query results.

The query answering system 104 also includes an external data analysis system 120 configured to receive external data, such as from a user or a third party, and to permit a user to analyze the external data using the query answering system 104. For example, external data analysis system 120 may be configured to determine that data in the entities database 116 (e.g., attribute data) is related to data in the external data, and may provide the related data in the entities database 116 to the user. As another example, the external data analysis system 120 may be configured to process and/or retrieve data from the external data in response to a natural language query submitted by a user.

As an illustrative example, the external data may include a spreadsheet uploaded to the query answering system 104 by a user. In this example, the external data analysis system 120 may be configured to analyze the spreadsheet to identify in the spreadsheet entities stored in the entities database 116. Additionally, the external data analysis system 120 may be configured to analyze the spreadsheet to determine how data in the spreadsheet should be interpreted. For example, it may be determined whether text should be interpreted as a number, a string, etc. If it is determined that text should be interpreted as a number, it may be determined whether a unit should be assumed and, if so, which unit (e.g., miles per hour, U.S. currency, etc.). In some embodiments and/or scenarios, knowledge of the format of the spreadsheet may be available a priori. For example, it may be known that the first row of the spreadsheet includes financial data. Thus, the external data analysis system 120 may be configured to utilize a priori information regarding the spreadsheet, when available, to determine how data in the spreadsheet should be interpreted.

As another illustrative example, the external data may include one or more images, each having metadata stored according to a known format (e.g., the Exchangeable image file format (Exit)). The metadata may include information such as geolocation information, time and date information, etc. In this example, the external data analysis system 120 may be configured to analyze the metadata to identify in the metadata entities stored in the entities database 116. Additionally, the external data analysis system 120 may be configured to analyze the metadata or other associated data (e.g., file size) to determine how the data should be interpreted. For example, it may be determined whether text should be interpreted as a number, a date, a time, etc. If it is determined that text should be interpreted as a number, it may be determined whether a unit should be assumed and, if so, which unit (e.g., latitude/longitude, GPS, inches, millimeters, seconds, etc.). In some embodiments and/or scenarios, knowledge of the format of the images may be available a priori. For example, image data may be stored according to a standardized format. Thus, the external data analysis system 120 may be configured to utilize a priori information regarding the data format, when available, to determine how data in or associated with the images should be interpreted.

As another illustrative example, the external data may include data obtained via an application programming interface (API). For example, a third party may provide access to data via an API, and the external data analysis system 120 may be configured to retrieve the third party data via the API. In this example, the external data analysis system 120 may be configured to analyze the data received via the API to identify in the data entities stored in the entities database 116. Additionally, the external data analysis system 120 may be configured to analyze the data to determine how the data should be interpreted. For example, it may be determined whether text should be interpreted as a number, a date, a time, etc. If it is determined that text should be interpreted as a number, it may be determined whether a unit should be assumed and, if so, which unit (e.g., inches, millimeters, seconds, etc.). In some embodiments and/or scenarios, knowledge of the API format is available a priori. For example, different API calls return different types of data in known formats. Thus, the external data analysis system 120 may be configured to utilize a priori information regarding the API, when available, to determine how data received in response to API calls should be interpreted. API calls may be utilized to devices such as pedometers (e.g., FitBit), medical devices, tsunami monitoring devices, etc., from databases that change over time, such as event databases (e.g., the Live Nation concert event database), music databases (e.g., the freedb.org database, the MusicBrainz database, etc.), etc.

As another illustrative example, the external data may be a database schema or data structure having a defined format, such as the Oracle Financials database or data structures formats. Knowledge of the defined format may be utilized to interpret meanings of data elements in the database or data structure.

Analyzing the external data may include processing similar to that of the query answering system 104 discussed above. For example, it may be determined whether/which entities correspond to a word in the external data. For example, the entities database 116 may be queried with the word. Rankings may be determined based on attributes of entities that correlate with the word. For example the word "Manhattan" may refer, among other things, to either "Manhattan, N.Y." or "Manhattan, Ill." Manhattan, N.Y. will be ranked higher than Manhattan, Ill. with respect to the attribute population. In this way, like entities may be compared based on common criteria, and one will rank higher than the other.

Rankings of meanings and/or senses of a word may be determined based on other terms in the external data. For example, other terms in the external data may indicate information such as the time zone to which time values refer, to which country currency values correspond, the state in which cities are located, etc.

Rankings of meanings and/or senses of the word may be determined also based on user attributes, in an embodiment. For example, a GeoIP location may indicate information such as the time zone the user is in, the currency of the user's country, and the dominant language spoken in the user's area, etc. The user's location may be used to judge distances or likelihoods that entities will be familiar or foreign to that user. For example, the term "Independence Day" in a query may refer to any of a hundred Independence Days throughout the world. But rankings of the different Independence Days may be generated based on a geographical location of the user. For example, if the user is located in the United States, the sense of "Independence Day" referring to July 4 may be ranked high.

Disambiguating certain formatting conventions of words/terms, such as the preferred date format, can depend on the user's GeoIP location as well. While Europe uses a day/month format, the United States uses a month/day format. The user's location may thus provide information so that one date format may be ranked higher than another.

In an embodiment, customized user attribute information may be used. If the user chooses different entities than the default assumption, then a profile may develop linking the user to those choices. By this method, the external data analysis system 120 can learn and remember which specific assumptions to make to a particular user, a particular type of external data, etc. In another embodiment, a user may voluntarily supply attributes in response to prompts, for example. For example, may choose to maintain a profile with the query answering system 104.

In an embodiment, customized attribute information that corresponds to the external data may be used. For example, a user may indicate in a profile associated with the external data specific assumptions or types of assumptions to make when analyzing the external data. In another embodiment, a user may voluntarily supply attributes in response to prompts generated by the external data analysis system 120 when the external data is being analyzed by the external data analysis system 120 and/or prior to the analysis, for example.

After the external data is processed by the external data analysis system 120, the external data analysis system 120 is configured to analyze natural language queries regarding the external data, and to respond to the natural language queries based on the processed external data. For example, with a spreadsheet that includes rows corresponding to different space missions (e.g., Mercury 3, Gemini 3, Apollo 7, Apollo 13, etc.), and columns providing associated data such as dates, costs, etc., a received query may be "space missions that launched in the 1960's". In response, the external data analysis system 120 may analyze the query and the external data, and may provide an answer to the query based on the processed external data, such as a list of space missions in the external data and related information such as dates, associated costs, etc. The external data analysis system 120 may also provide additional information generated by the external data analysis system 120 using the external data, such as an average cost of the space missions, an average cost of the space missions in the 1960's, a histogram showing the number of space missions in each year of the 1960's, in each decade, etc.

Figure 2:
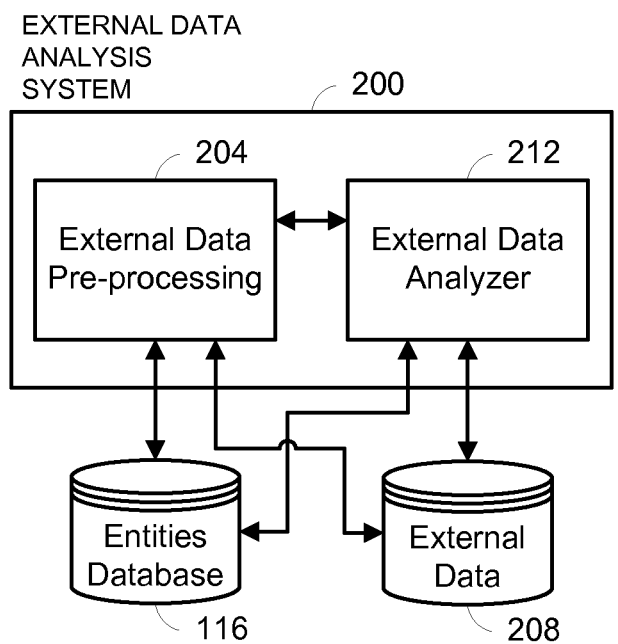
FIG. 2 is a block diagram of an example external data analysis system utilized in the system of FIG. 1, according to an embodiment.

FIG. 2 is a block diagram of an example external data analysis system 200, according to an embodiment. The external data analysis system 200 may be utilized in the system 100 of FIG. 1, in an embodiment. In other embodiments, other suitable external data analysis systems may be utilized in the system 100 of FIG. 1. In an embodiment, the external data analysis system 200 is implemented on a computer system including one or more computing devices such as a server, a workstation, a mainframe, etc. The system 200 may be a stand-alone executable application with its own user interface. Also, the system 200 could be an added feature or subsystem of a larger application such as a computational application (e.g., the MATHEMATICA® software system available from Wolfram Research, Inc., a spreadsheet application, etc.). For example, the system 200 could be an applet accessed via a website. Further, the system 200 may also be implemented as a Web service with a Web browser implementing the user interface in a known manner. For example, the system 200 could be browser plug-in or toolbar system.

The external data analysis system 200 includes an external data pre-processor 204 coupled to the entities database 116 and to a database 208. The external data pre-processor 204 may receive the external data and store the data in the database 208. For example, the external data may be received in response to a user requesting to upload and uploading external data. As another example, the external data may be received in response to the external data analysis system 200 generating and transmitting one or more API calls via the network 112.

Additionally, the external data pre-processor 204 processes the external data to determine how the external data should be interpreted. For example, the external data pre-processor 204 may identify matches of words and/or terms in the external data with entities in the entities database 116. Additionally, when a word or term in the external matches with multiple entities in the entities database 116, the external data pre-processor 204 may make an assumption regarding to which of the entities the word or term corresponds. As another example, the external data pre-processor 204 may determine how words and/or terms in the external data should be interpreted, e.g., whether a term/string or number, whether/which unit should be associated with a number, etc. Thus, the external data pre-processor 204 canonicalizes the external data relative to the query answering system 104 and/or the entities database 116. For instance, elements of the external data are mapped to canonical elements understood by the query answering system 104.

After processing the external data, the external data pre-processor 204 may generate a set of data that corresponds to the external data, but that includes indicators of how elements of the external data should be interpreted. The external data pre-processor 204 may be configured to make assumptions regarding the meanings of words, terms, phrases, etc., when multiple meanings are possible. Additionally, the set of data may be in a format different than the external data and known to the external data analysis system 200.

The indicators of how elements of the external data should be interpreted may be keywords. As an example, the word "pi" can refer to different things, like the name of the well-known mathematical constant ($\pi$) or the name of the movie "pi". If it is assumed that the word "pi" is referring the mathematical constant, the indication of the assumption may be the keyword "NamedConstant" or some other suitable keyword. If it is assumed that the word "pi" is referring the movie, the indication of the assumption may be the keyword "Movie" or some other suitable keyword.

The indication of an assumption for a word, a phrase, a group of textual characters, etc., is associated with the word, the phrase, the group of textual characters, etc., in the external data so that the external data analysis system 200 can determine to which word, phrase, group of textual characters, etc., the assumption applies. The indication is associated with the word, the phrase, the group of textual characters, etc., using a precise syntax known to the external data analysis system 200.

As another example, the letter "m", standing alone or in combination with other characters such as "1" may refer to units of meters or minutes. If it is assumed that "m" is referring to units of meters, the indication of the assumption may be the keywords "Unit" and "Meters" or some other suitable keywords. The keywords "Unit" and "Meters" may be associated to indicate that "Meters" is a subtype of "Units". If it is assumed that "m" is referring units of minutes, the indication of the assumption may be the keyword. "Unit" and "Minutes" or some other suitable keywords. The keywords "Unit" and "Minutes" may be associated to indicate that "Minutes" is a subtype of "Units".

As another example, the word "hamburger" may refer to the food hamburger, or more specifically to a hamburger from McDonald's®, a hamburger from Burger King®, etc. If it is assumed that "hamburger" is referring to the basic hamburger, the indication of the assumption may be the keywords "Food" and "Hamburger" or some other suitable keywords. The keywords "Food" and "Hamburger" may be associated to indicate that "Hamburger" is a subtype of "Food". If it is assumed that "hamburger" is referring to a hamburger from McDonald's®, the indication of the assumption may be the keywords "Food" and "McDonaldsHamburger" or some other suitable keywords. The keywords "Food" and "McDonaldsHamburger" may be associated to indicate that "McDonaldsHamburger" is a subtype of "Food". If it is assumed that "hamburger" is referring to a hamburger from Burger King®, the indication of the assumption may be the keywords "Food" and "BurgerKingHamburger" or some other suitable keywords. The keywords "Food" and "BurgerKingHamburger" may be associated to indicate that "BurgerKingHamburger" is a subtype of "Food".

As another example, the input "3:00" may refer to either an AM time or a PM time. If it is assumed that "3:00" is referring to an AM time, the indication of the assumption may be the keyword "am" or some other suitable keyword. Similarly, if it is assumed that "3:00" is referring to a PM time, the indication of the assumption may be the keyword "pm" or some other suitable keyword.

As another example, the input "12/11/1996" may refer to either Dec. 11, 1996 or Nov. 12, 1996. In other words, the format may be month/day/year or day/month/year. If it is assumed that the format is month/day/year, the indication of the assumption may be the keyword "MonthDayYear" or some other suitable keyword. Similarly, if it is assumed that the format is day/month/year, the indication of the assumption may be the keyword "DayMonthYear" or some other suitable keyword.

As another example, with data including elements separated by spaces, it may be ambiguous whether the data is to be interpreted as a multiplication of elements or a list of elements. For example, the term "3 x" could be interpreted as 3*x, but it could also be the list {3, x}. If it is assumed that elements separated by a space or spaces is a multiplication of the elements, the indication of the assumption may be the keyword "Times" or some other suitable keyword. Similarly, if it is assumed that elements separated by a space or spaces is a list of elements, the indication of the assumption may be the keyword "List" or some other suitable keyword.

As another example, with a data that contains elements separated by a comma, it may be ambiguous whether the data is to be interpreted as a number with a comma for a thousands separator or a list of elements. For example, the query "1,234" could be interpreted as the number one thousand two hundred and thirty four, but it could also be the list {1, 234}. If it is assumed that two elements separated by a comma is a number, the indication of the assumption may be the keyword "Number" or some other suitable keyword. Similarly, if it is assumed that a set of elements separated by a comma is a list of elements, the indication of the assumption may be the keyword "List" or some other suitable keyword.

As another example, with data that contains a number having only zeros and ones, it may be ambiguous whether the data is to be interpreted as a binary number or a base 10 number. For example, the query "100110101" could be interpreted as a binary number or a base 10 number. If it is assumed that the number is a binary number, the indication of the assumption may be the keyword "Binary" or some other suitable keyword. Similarly, if it is assumed that the number is a base 10 number, the indication of the assumption may be the keyword "Decimal" or some other suitable keyword.

As another example, with data that contains a series of letters, it may be ambiguous whether the data is referring to a DNA sequence. For example, the query "AGGGAAAA" could be interpreted as a DNA sequence. If it is assumed that an input is a DNA sequence, the indication of the assumption may be the keyword "DNA" or some other suitable keyword.

One or more indicators of one or more assumptions made by the external data pre-processor 204 may be included in the processed data set generated by the external data pre-processor 204 and stored in the database 208. For example, if keywords are utilized for indicating assumptions, an expression generated by the external data pre-processor 204 may include the keywords, and the keywords are associated with respective words, phrases, groups of textual characters, etc., to indicate to which words, phrases, groups of textual characters, etc., the assumptions correspond.

The external data analysis system 200 also includes an external data analyzer 212 coupled to the entities database 116 and the database 208. The external data analyzer 212 is configured to generate answers to queries regarding the external data. The external data analyzer 212 may utilize techniques such as described in U.S. patent application Ser. No. 12/780,685 to interpret natural language queries. Additionally, the external data analyzer 212 may utilize the information indicating how the external data is to be interpreted to generate answers to queries. Additionally, the retrieve information in the entities database 116 and include the retrieved information in answers to queries regarding the external data. For example, if the external data is a spreadsheet including information regarding space missions, and the query is "what was launch date of Apollo 13," the external data analyzer 212 may determine the requested date from the external data and also determine information associated with the date and/or retrieve information regarding the date from the entities database 116, e.g., notable events on that date, how long from present date, etc. Thus, the external data analyzer 212 is configured to permit a user to interrogate the external data (by way of natural language queries, for example) after the external data has been mapped to canonical elements known to the external data analysis system 200.

Although the external data pre-processor 204 and the external data analyzer 212 are illustrated in FIG. 2 as being separate, the external data pre-processor 204 and the external data analyzer 212 may share processing resources in some embodiments. For example, there may be common processing resources for pre-processing the external data and processing queries. Similarly, the external data pre-processor 204 and the external data analyzer 212 may share processing resources with other components of the query answering system 104.

In one embodiment, the external data database 208 is included in the entities database 116. In another embodiment, the external data database 208 and the entities database 116 are separate databases.

Figure 3:
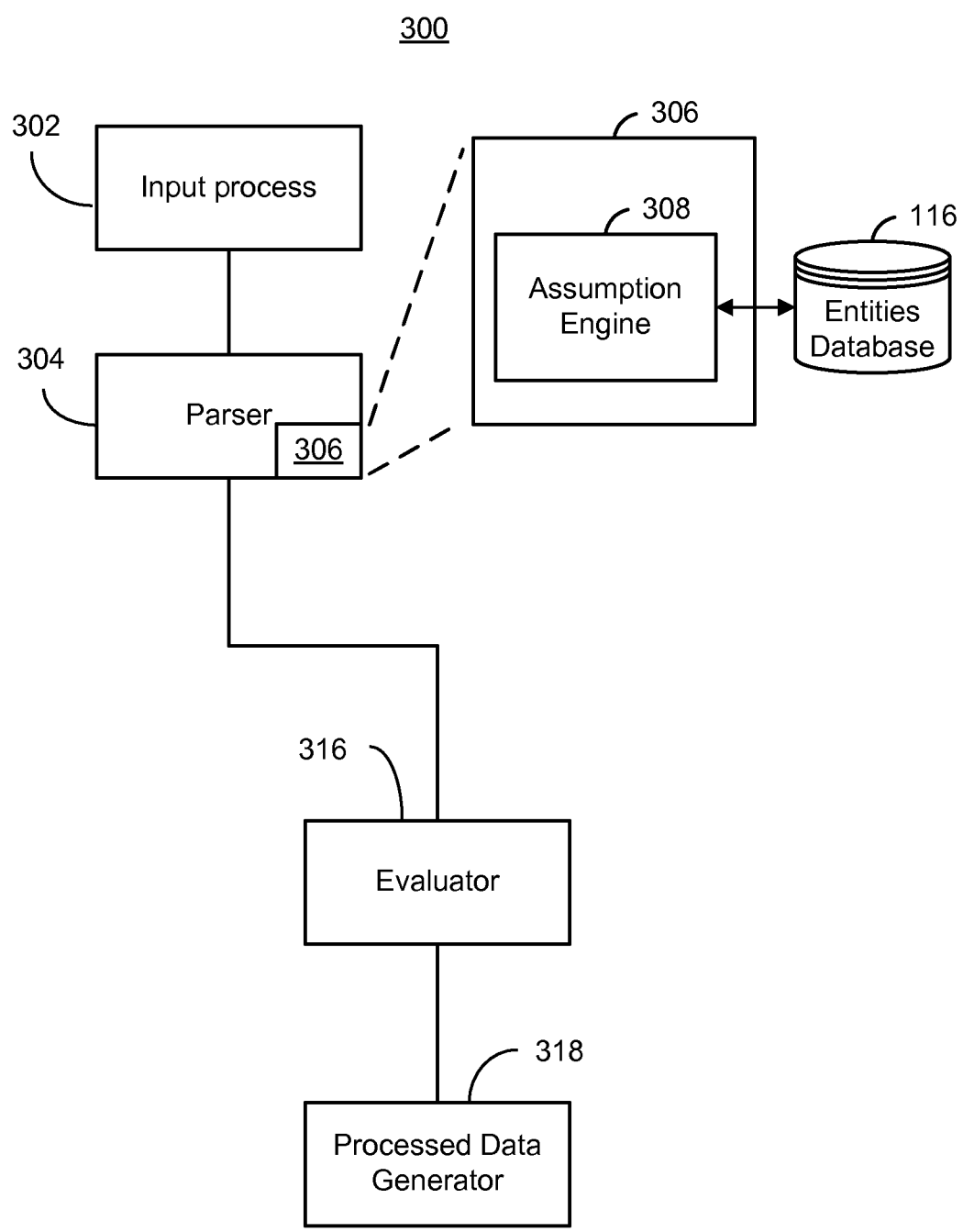
FIG. 3 is a block diagram of an example external data pre-processor utilized in the system of FIG. 2, according to an embodiment.

FIG. 3 is a block diagram of an example external data pre-processor 300, according to an embodiment. The data pre-processor 300 may be utilized in the external data analysis system 200 of FIG. 2, in an embodiment. In other embodiments, other suitable external data pre-processor may be utilized in the external data analysis system 200 of FIG. 2. In an embodiment, the external data analysis system 300 is implemented on a computer system including one or more computing devices such as a server, a workstation, a mainframe, etc.

The system 300 may include an input process 302 for receiving the external data. The input process 302 may receive external data in one or more formats (e.g., spreadsheet, database, images, etc.), and data elements in the external data may be in an imprecise syntax.

The system 300 may also include a parser 304 communicatively coupled to the input process 302. The parser 304 may examine the input to extract keywords, group words into phrases, identify numerical expressions, categorize data, etc., for example. The parser 304 may perform an initial go/no go analysis on the keywords, phrases, or numerical expressions to determine if there is enough information to proceed to a further step. When there is not enough information to make even a cursory pass at further analysis, the parser 304 may cause the user to be prompted for additional information such as information that may clarify the data. Alternatively, the system 300 may return the input unchanged along with a message that it cannot interpret the input.

In one implementation, the parser 304 may take an initial input and create tokens, and then assemble the tokens into one or more expressions in a precise syntax. In other words, the parser 304 may generally take input data in an imprecise syntax and generate expressions in a precise syntax. The parser 304 may utilize knowledge of the format of the external data to parse the data. As an example, if the external data is a spreadsheet, the parser 304 may iteratively process rows, columns, etc.

Optionally, the parser 304 may perform additional processing. For example, the parser may attempt to identify phrases. Additionally, the parser 304 may attempt to rearrange tokens to see if the rearrangements match something that the parser 304 understands, such as a phrase. For instance, the parser 304 may utilize algorithmic rearrangements of terms in a data element. Also, the parser 304 may cause the user to be prompted to rephrase an element. Then, the parser 304 may analyze the original element in conjunction with the rephrased element. Further, the parser 304 may utilize machine learning techniques to identify language processing algorithms that work better than others.

In one embodiment, the parser 304 includes an assumption system 306. The assumption system 306 includes an assumption engine 308 and includes or is coupled to the entities database 116. In one embodiment, the assumption system 306 provides an indication of an assumption for each word or phrase that the assumption system 306 recognizes. In an embodiment, the assumption system 306 is able to recognize words and phrases that are stored in the entities database 116. For example, the assumption engine 308 may search for words, phrases, groups of textual characters, etc., that are stored in the entities database 116 and correspond to entities known by the system 300. The entities database 116, in an embodiment, is a structured database storing entities organized into categories, sub-categories, etc. In one embodiment, the entities database 116 stores attributes of entities. For example, an entity "hamburger" may be a subcategory of "Food". A "hamburger" may have attributes such as size (large patty, regular patty, small patty), patty count (one, two, etc.), variety (plain, with condiments, etc.). In some embodiments, an entity can belong to multiple categories, sub-categories, etc. For example, a hamburger could be categorized as "Food" and also categorized as "Fast Food", which is a sub-category of Food.

As discussed above, the indication of the assumption may be a keyword.

One or more indicators of one or more assumptions made by the assumption system 306 may be included in one or more expression in a precise syntax generated by the parser 304. For example, if keywords are utilized for indicating assumptions, an expression generated by the parser 304 may include the keywords, and the keywords are associated with respective words, phrases, groups of textual characters, etc., to indicate to which words, phrases, groups of textual characters, etc., the assumptions correspond.

In an embodiment, the assumption system 306 also generates indicators of one or more additional assumptions that can be made about a word, phrase, group of textual characters, etc. These indicators may be used by the system 300 to permit a user to change assumptions made by the system 300.

The one or more expressions generated by the parser 304 may be provided to one or more scanners 314 that may each have a particular focus. For example, scanner 314-1 may be directed to developing a graphical plot for numerical expressions or phrases parsed from the input that can be reduced to a plot. As an example, if an input includes a plurality of numerical values, scanner 314-1 may develop and output one or more plots of the values using one or more plot types (e.g., line graph, histogram, etc.).

Some scanners 314 may generate results based on a database query. For example, a scanner 314 related to geometry formulas may query a database (such as the entities database 116 or another database) for keywords "area" and "triangle" for formulas related to those terms. As another example, a scanner 314 may query a database (such as the entities database 310 or another database) for raw data needed to evaluate an expression. For instance, an expression may include c, the speed of light, and a scanner may query a database to retrieve a numerical value for c. As another example, an expression may require statistical data, such as a population of a particular city, state, or country needed to evaluate a "per capita" expression, and the scanner 314 may query a database (such as the entities database 310 or another database) to obtain the needed data.

Other scanners 314 may generate results by synthesizing outputs. For example, a scanner 314 may receive a plurality of values and generate statistical values such as mean, median, variance, maximum, minimum, etc. Some scanners 314 may be capable of doing database queries as well as synthesis of results.

In addition to receiving data from the parser 304, each scanner 314 may share results with each of the other scanners. Again, results generated by a scanner 314 based on the shared results may also be shared with each of the other scanners 314, and so on. This process may continue until the scanners 314 no longer have additional data to add, for example. Trivial transforms may also be recognized and blocked.

Depending upon the application, more or less scanners 314 may be utilized. For instance, if an application is to be devoted for use in a financial field, scanners related to chemical formulas may be omitted.

For each word or phrase that the assumption system 306 chooses a meaning/sense, the parser 304 provides, to an evaluator 316, information that indicates the chosen meaning/sense. For example, the parser 304 may provide keywords or other indicators of the assumptions made. In an embodiment, the evaluator 316 uses the assumption information (e.g., keywords) in evaluating possible meanings of words, phrases, etc., in the external data. Additionally, the evaluator 316 may obtain and utilize additional information related to the assumption using the assumption. For example, if it is assumed that the word "pi" refers to the movie, the scanners 314 can obtain and utilize other information related to the movie "pi" such as the year of its release, the name of the director, the box office receipts. The additional information related to the assumption may be stored in the entities database 116 or another database (e.g., the external data database 208). In one embodiment, the entities database 116, or another database (e.g., the external data database 208), stores attributes of entities stored in the entities database 116. The stored attributes of entities may provide additional information that can be utilized by the evaluator 316. As an example, the entities database 116, or another database, stores movie entities and attributes of movies such as the year of release, the name of the director, the names of actors, the box office receipts, etc.

As discussed above, the evaluator 316 evaluates different possible meanings/senses or words, phrases, numbers, etc. The evaluator 316 generates rankings of different possible meanings, in some embodiments. The evaluator 316 generates an output that indicates how the external should be interpreted. For example, if the external data corresponds to a spreadsheet, the evaluator 316 generates an output indicating the number of rows, the number of columns, which data corresponds to which cells, rows, and/or columns, how data in each cell should be interpreted, etc. The evaluator 316 may not consider ranked meanings/senses that are below a threshold. The threshold may be set at a predetermined level, or may be adjusted according to the number of results and a statistical analysis of the rankings. For example, an analysis that produces ten thousand possible meanings/senses, the threshold may be adjusted to 99% relevance, thereby limiting consideration to the top 100. In another example though, where perhaps only a half a dozen meanings/senses are returned, all the results may be considered even though the rankings may be relatively low.

The output of the evaluator 316 is provided to an output module 318 which may generate an output using the output generated by the evaluator 316 and the external data. The output of the output module 318 is processed data that corresponds to the external data and that can be interpreted by the external data analyzer 212 (FIG. 2). Additionally, the output module 318 may generate a web page, a window, etc., that corresponds to the external data and that shows the interpreted external data and related data obtained from the entities database 116.

In an embodiment, the output module 318 receives indicators of one or more additional assumptions that can be made about a word, phrase, group of textual characters, etc., from the assumption system 306. The output module 318 may utilize these indicators to provide information relating to the other assumptions that can be made and to provide user interface mechanisms that permit a user to change assumptions made by the system 300 in order so that the external data analyzer 212 (FIG. 2) interprets the external data in a different manner.

In an embodiment, the output module 318 is configured to generate an output corresponding to the external data that has a format the same as or similar to a data format of the entities database 116, i.e., a structured database storing entities (new from the external data) organized into categories, sub-categories, etc., and storing attributes of entities. For example, with a spreadsheet that includes rows corresponding to different space missions (e.g., Mercury 3, Gemini 3, Apollo 7, Apollo 13, etc.), and columns providing associated data such as dates, costs, etc., each row may correspond to a new entity (e.g., Mercury 3, Gemini 3, Apollo 7, Apollo 13, etc.), and elements of a row may correspond to attributes of the associated entity. For instance, the cost element for the row labeled "Mercury 3" may be identified as an attribute of the entity "Mercury 3". Continuing with this example, a category "space missions" may be generated, and the individual space missions corresponding to the rows may be sub-categories within the "space missions" category. Attributes of the category "space missions" may include average cost, median cost, maximum cost, minimum cost, number of space missions, etc.

In an embodiment, the spreadsheet as a whole may be identified as an entity, and rows in the spreadsheet may be identified entities that are subcategories under the spreadsheet. For example, attributes of a spreadsheet may include title, number of rows, number of columns, file size, etc.

Outputs of the output module 318 may be stored in the database 208 or another suitable database, such as the entities database 116.

Referring again to FIG. 2, the external data analyzer 212 is configured to interrogate and/or process the output of the output module 318 in response to user queries (e.g., natural language queries). The external data analyzer 212 may have a structure similar to the external data pre-processor 300 of FIG. 3.

Figure 4:
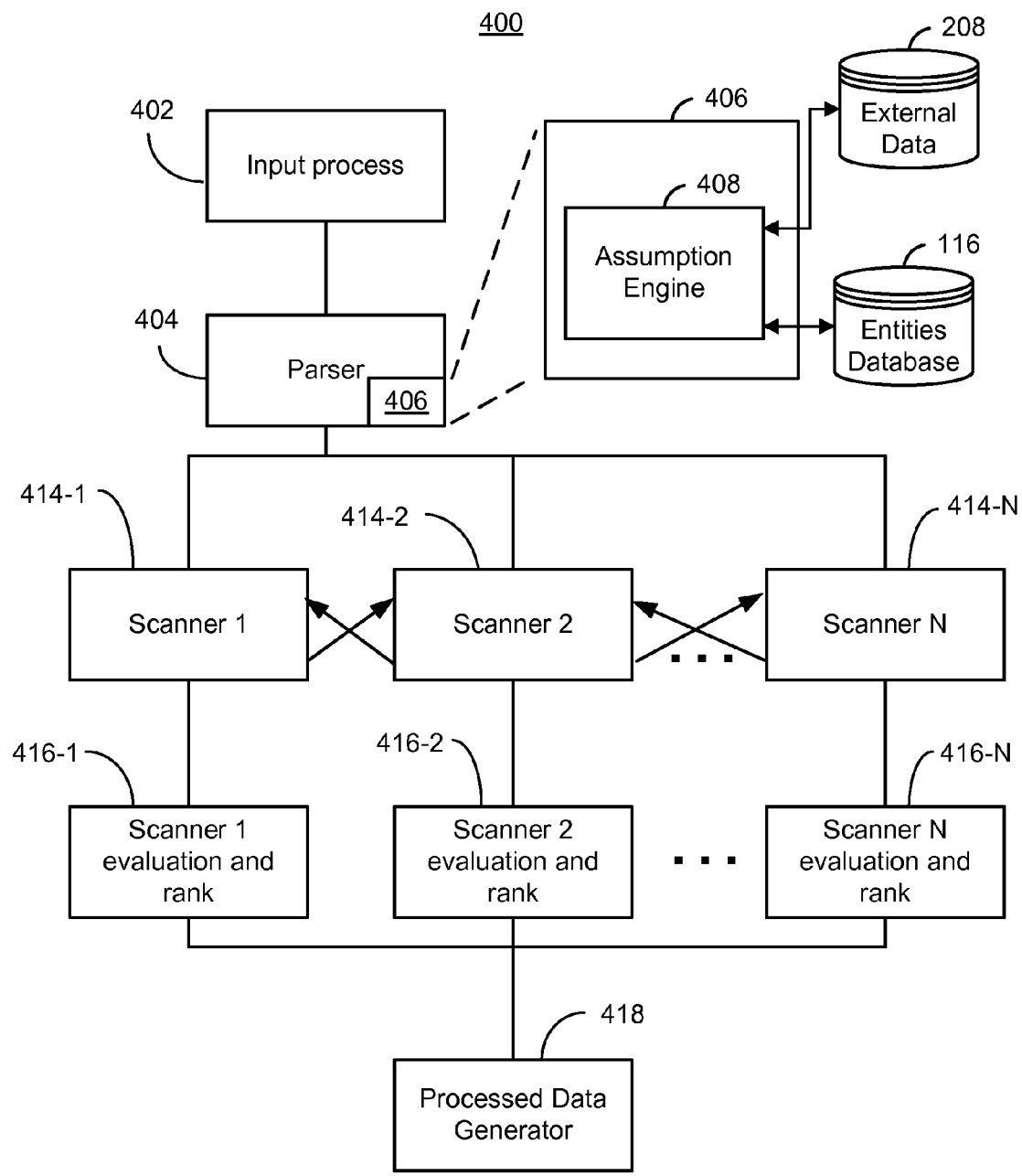
FIG. 4 is a block diagram of an example external data analyzer utilized in the system of FIG. 2, according to an embodiment.

FIG. 4 is a block diagram of an example external data analyzer 400. The external data analyzer 400 may be utilized in the external data analysis system 200 of FIG. 2, in an embodiment. In other embodiments, other suitable external data analyzers may be utilized in the external data analysis system 200 of FIG. 2. In an embodiment, the external data analyzer 400 is implemented on a computer system including one or more computing devices such as a server, a workstation, a mainframe, etc.

The system 400 may include an input process 402 for receiving a query in an imprecise syntax. The system 400 may also include a parser 404 communicatively coupled to the input process 402. The parser 404 may examine the input to extract keywords, group words into phrases, identify numerical expressions, categorize data, etc., for example. The parser 404 may perform an initial go/no go analysis on the keywords, phrases, or numerical expressions to determine if there is enough information to proceed to a further step. When there is not enough information to make even a cursory pass at further analysis, the parser 404 may cause the user to be prompted for additional information such as information that may clarify the query. Alternatively, the system 400 may return the input unchanged along with a message that it cannot interpret the input.

In one implementation, the parser 404 may take an initial input and create tokens, and then assemble the tokens into one or more expressions in a precise syntax. In other words, the parser 404 may generally take input data in an imprecise syntax and generate expressions in a precise syntax. The parser 404 may utilize an output of the external data pre-processor 204 to parse the data.

Optionally, the parser 404 may perform additional processing. For example, the parser may attempt to identify phrases. Additionally, the parser 404 may attempt to rearrange tokens to see if the rearrangements match something that the parser 404 understands, such as a phrase. For instance, the parser 404 may utilize algorithmic rearrangements of terms in a data element. Also, the parser 404 may cause the user to be prompted to rephrase an element. Then, the parser 404 may analyze the original element in conjunction with the rephrased element. Further, the parser 404 may utilize machine learning techniques to identify language processing algorithms that work better than others.

In one embodiment, the parser 404 includes an assumption system 406. The assumption system 406 includes an assumption engine 408 and includes or is coupled to the entities database 116 and/or the database 208 (storing processed external data). In one embodiment, the assumption system 406 provides an indication of an assumption for each word or phrase that the assumption system 406 recognizes. In an embodiment, the assumption system 406 is able to recognize words and phrases that are stored in the entities database 116 and/or the database 208 (storing processed external data). For example, the assumption engine 408 may search for words, phrases, groups of textual characters, etc., that are stored in the entities database 116 and/or the database 208 and that correspond to entities known by the system 400. The entities database 116, in an embodiment, is a structured database storing entities organized into categories, sub-categories, etc.

As discussed above, the indication of the assumption may be a keyword.

One or more indicators of one or more assumptions made by the assumption system 406 may be included in one or more expression in a precise syntax generated by the parser 404. For example, if keywords are utilized for indicating assumptions, an expression generated by the parser 404 may include the keywords, and the keywords are associated with respective words, phrases, groups of textual characters, etc., to indicate to which words, phrases, groups of textual characters, etc., the assumptions correspond.

In an embodiment, the assumption system 406 also generates indicators of one or more additional assumptions that can be made about a word, phrase, group of textual characters, etc. These indicators may be used by the system 400 to permit a user to change assumptions made by the system 400.

As discussed above, in some embodiments, the assumption system 406 may utilize data in the database 208 (storing processed external data) in making assumptions regarding the meaning of a word, term, phrase, etc. Thus, in some scenarios and depending on the data in the database 208 (storing processed external data), the assumption system 406 may make a different assumption regarding a word, term, phrase, etc., for a different set of external data and/or when the query answering system 104 is processing the same word, term, phrase, etc., in response to a query not associated with the external data. For example, the query answering system 104 may interpret the word "orange" in the phrase "bookstores in orange" as Orange County, Calif., when processing a general query, but may interpret the word "orange" in the phrase "bookstores in orange" as Orange, N.Y. when processing a query specific to a particular set of external data. In other words, the linguistics of the query answering system 104 may be modified when processing queries in different contexts (e.g., general query versus query specific to external data, queries directed to different sets of external data, etc.).

The one or more expressions generated by the parser 404 may be provided to one or more scanners 414 that may each have a particular focus. Scanners such as described above may be utilized, as well as other suitable scanners such as described in U.S. patent application Ser. No. 12/780,685. Depending upon the application, more or less scanners 414 may be utilized. For instance, if an application is to be devoted for use in a financial field, scanners related to chemical formulas may be omitted.

At least some scanners 414 may obtain and utilize additional information related to the assumption using the assumption. For example, if it is assumed that the word "pi" refers to the movie, the scanners 414 can obtain and utilize other information related to the movie "pi" such as the year of its release, the name of the director, the box office receipts. The additional information related to the assumption may be stored in the entities database 116, the database 208, or another database. In one embodiment, the entities database 116 and/or the database 208, or another database, stores attributes of entities stored in the entities database 116 and/or the database 208. The stored attributes of entities may provide additional information that can be utilized by the scanners 414. As an example, the entities database 116 and/or the database 208, or another database, stores movie entities and attributes of movies such as the year of release, the name of the director, the names of actors, the box office receipts, etc.

When each scanner 414 has contributed to both the original input from the parser 404 and shared input from all the other scanners 414, the results from each scanner to respective postprocessors 416. The postprocessors 416 evaluate the results and may provide a ranking of each result by assigning a value (e.g., a percentage) to each result.

The ranked results may be passed to an output module 418 which may generate an output using the results with rankings above a certain threshold, while omitting results below the threshold. The threshold may be set at a predetermined level, or may be adjusted according to the number of results and a statistical analysis of the rankings. For example, a query that produces ten thousand results may adjust the threshold to 99% relevance, thereby limiting the results to the top 100. In another example though, where perhaps only a half a dozen results are returned, all the results may be displayed even though the rankings may be relatively low. In an embodiment, the output module 418 receives indicators of one or more additional assumptions that can be made about a word, phrase, group of textual characters, etc., from the assumption system 406. The output module 418 may utilize these indicators to provide information relating to the other assumptions that can be made and to provide user interface mechanisms that permit a user to change assumptions made by the system 400.

An output of the output module 418 may be in a suitable format such as a web page, a display, a file, etc. In an embodiment, the output module 418 may be configured to generate a file having a comma separated values (CSV) format, an extensible characterization language (XCL) format, or another suitable format.

As discussed above, the external data pre-processor 204 and the external data analyzer 212 may share processing resources in some embodiments. Similarly, the external data pre-processor 204 and the external data analyzer 212 may share processing resources with other components of the query answering system 104. For example, one or more of the parser 404, the assumption system 406, the scanners 414, the postprocessors 416, the output module 418, etc., may be shared with the query answering system, and/or the external data pre-processor 300. For example, one scanner may be configured to operate differently depending on whether it is processing a general query, performing preprocessing, or analyzing external data.

Referring again to FIG. 1, the external data analysis system 120 may be configured to implement a wizard to assist a user in uploading external data to the system 104. For example, a web page, a display, etc., may assist the user in selecting a file on the user computer 108 for uploading. Additionally, the wizard may prompt the user to enter data regarding how the external data is to be interpreted. For example, when assumptions regarding meanings are made, the user may be prompted to review the assumptions, be provided with alternative assumptions, and asked to choose whether an alternative assumption should be made. As another example, after the external data has been processed by the pre-processor 204, the wizard may prompt a user to decide what data should be included in response to queries. For instance, for a spreadsheet related to space missions and that includes information regarding the country or countries involved in each mission, the user may be prompted to decide whether a map highlighting the country or countries involved should be included in the output, whether dates should be shown on a timeline, which statistics (e.g., maximum, minimum, mean, etc., of numbers in the spreadsheet) generated by the system should be included, etc. Also, if the output is in the form of a web page or display, the user may be prompted to modify the layout of the web page or display.

After uploading and pre-processing, the external data analysis system 120 may assign an indicator (ID) to the external data so that the user can subsequently access and analyze the external data using the system 104 by referencing the ID.

After uploading and pre-processing, the external data may remain private to the user in an embodiment. In other embodiments, a user may be permitted to make the external data available to others. In an embodiment, a user may be permitted to make the external data available to the public. In another embodiment, a user additionally or alternatively may be permitted to make the external data available to the certain users. For example, the system 104 and/or the system 200 may be configured to provide access control to the external data such that only authorized users are able to access the external data and/or process/query the external data using the query answering system 104. In another embodiment, the system 104 may be configured to restrict access to the external data to a particular organization such that only users from the organization are able to access the external data and/or process/query the external data using the query answering system 104.

As described above, in some embodiments, the query answering system may integrate or inter-link one data set with another data set. For example, linguistic analysis techniques for interpreting one data set may be utilized to allow analysis of another data set. On the other hand, in some embodiments, the linguistic analysis techniques for interpreting a particular word or phrase may be modified or may change depending on the context, i.e., one data set versus another. In an example, the parser 404 is configured to interpret words/phrases in a query differently depending on which external data is being analyzed or queried.

FIG. 5 is a flow diagram of an example method 500 that may be implemented by the system 104 of FIG. 1 or another suitable system. The method will be described with reference to FIGS. 1 and 2 for ease of explanation.

At block 504, a first data set (e.g., external data) may be received via a communication network. At block 508, the first data set may be analyzed to identify data in the first data set that corresponds to entities in a database comprising categorized entities (e.g., the entities database 116). For example, the external data pre-processor 204 may analyze external data to identify data that corresponds to entities in the entities database 116. In an embodiment, the system 300, the external data pre-processor 204, or another suitable system, may analyze the first data set.

At block 512, a second data set corresponding to the first data set and based on the analysis of the first data set may be generated. The second data set may include information that indicates how data in the second data set is to be interpreted by a query answering system (e.g., a natural language query answering system). In an embodiment, the system 300, the external data pre-processor 204, or another suitable system, may generate the second data set. At block 516, the second data set generated at block 512 is stored in a database. For example, the external data pre-processor 204 stores the second data set in the database 208.

At block 520, analysis of the first data set by the natural language query answering system is permitted by the natural language query answering system analyzing the second data set. For example, the external data analyzer 212 analyzes the second data set stored in the database 208 in response to queries.

Any of the techniques described above, including the blocks described with reference to FIGS. 1-5, may be implemented using a processor that executes machine readable software or firmware instructions. Such computer program instructions may control the operation of a computing device such as a desktop computer, a laptop computer, a tablet computer, a workstation, a server, a mainframe, a mobile phone (e.g., a smart phone), a telephone, a set top box, a PDA, a pager, a processing system of an electronic game, a processing system of a consumer electronics device, etc. The computing device may have a processor and a memory in which the computer program instructions may be stored. The processor is coupled to the memory and executes the computer program instructions. The computer program instructions may be written in any high level language such as the programming language used with MATHEMATICA® software systems, C, C++, C#, Java or the like or any low-level assembly or machine language. By storing computer program instructions in a memory of the computing device, the computing device is physically and/or structurally configured in accordance with the computer program instructions.

While many methods and systems have been described herein as being implemented using a processor executing machine readable instructions, they may be implemented at least partially in hardware, and may be implemented by a variety of computing systems and devices. Thus, the method blocks and system blocks described herein may be implemented in a standard multi-purpose central processing unit (CPU), a special purpose CPU, or on specifically designed hardware such as an application-specific integrated circuit (ASIC) or other hard-wired device as desired. When implemented using a processor executing machine readable instructions, the machine readable instructions may be stored in any computer readable storage medium such as on a magnetic disk, a laser disk (such as a compact disk (CD), a digital versatile disk (DVD)), a flash memory, a memory card, a memory stick, a RAM, a ROM, a database, etc.

The present disclosure has been described with reference to specific examples, which are intended to be illustrative only and not to be limiting. It will be apparent to those of ordinary skill in the art that changes, additions or deletions may be made to the disclosed examples without departing from the spirit and scope of the disclosure. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of this application.

Thus, many modifications and variations may be made in the techniques and systems described and illustrated herein without departing from the spirit and scope of the present invention. Accordingly, it should be understood that the methods and systems described herein are illustrative only and are not limiting upon the scope of the invention.

What is claimed is:

1. A method, comprising:
receiving, by one or more computer processors, a first data set via a communication network, the first data set comprising content data items;
analyzing, by one or more computer processors, the content data items in the first data set to identify content data items in the first data set that correspond to entities in a database comprising categorized entities;
generating, by one or more computer processors, a second data set corresponding to the first data set and based on the analysis of the content data items in the first data set, wherein the second data set is generated to include the content data items modified to indicate how the content data items are to be interpreted by a natural language query answering system that is implemented by one or more computer processors;
outputting, by one or more computer processors, an indication of the information in the second data set indicating how data in the first data set is to be interpreted by the natural language query answering system;
receiving, by one or more computer processors, modified information in the second data set indicating how data in the first data set is to be interpreted by the natural language query answering system;
storing, by one or more computer processors, the second data set in a database communicatively coupled to the natural language query answering system;
analyzing, by one or more computer processors, the second data set using the natural language query answering system to facilitate analysis of a natural language query regarding the first data set using the natural language query answering system, including analyzing the modified content items with the natural language query answering system; and
outputting, by one or more computer processors, results of the analysis using the natural language query answering system.

2. A method according to claim 1, wherein generating the second data set is based on knowledge of a format of the first data set.

3. A method according to claim 1, wherein receiving the first data set via the communication network is in response to an upload request from a user.

4. A method according to claim 1, wherein the first data set comprises or is included in a spreadsheet file.

5. A method according to claim 1, wherein the analysis of the second data set using the natural language query answering system comprises:
retrieving data from the second data set in response to the query regarding the first data set; and
generating electronic display information including the data retrieved from the second data set.

6. A method according to claim 1, wherein the analysis of the second data set using the natural language query answering system comprises:
processing data from the second data set in response to the query regarding the first data set; and
generating electronic display information including the processed data from the second data set.

7. A method according to claim 1, wherein the natural language query answering system is configured to analyze data in the database comprising categorized entities in response to natural language queries.

8. A method according to claim 1, wherein generating the second data set comprises associating keywords with the content data items, the keywords indicating to the natural language query answering system how the content data items are to be interpreted.

9. A non-transitory tangible computer readable storage medium having stored thereon machine executable instructions, the machine executable instructions, when executed by one or machines, to:
analyze content data items in a first data set, the first data set received via a communication network, to identify content data items in the first data set that correspond to entities in a database comprising categorized entities;
generate a second data set corresponding to the first data set and based on the analysis of the content data items in the first data set, wherein the second data set is generated to include the content data items modified to indicate how the content data items are to be interpreted by a natural language query answering system that is implemented by one or more computer processors;
output an indication of the information in the second data set indicating how data in the first data set is to be interpreted by the natural language query answering system;
receive modified information in the second data set indicating how data in the first data set is to be interpreted by the natural language query answering system;
store the second data set in a database communicatively coupled to the natural language query answering system;
analyze the second data set using the natural language query answering system to facilitate analysis of a natural language query regarding the first data set using the natural language query answering system, including analyzing the modified content items with the natural language query answering system; and
output results of the analysis using the natural language query answering system.

10. A non-transitory tangible computer readable storage medium according to claim 9, having stored thereon machine executable instructions, the machine executable instructions, when executed by one or machines, to:
retrieve data from the second data set in response to the natural language query regarding the first data set, the natural language query submitted to the natural language query answering system; and
generate a display including the data retrieved from the second data set.

11. A non-transitory tangible computer readable storage medium according to claim 9, having stored thereon machine executable instructions, the machine executable instructions, when executed by one or machines, to:
process data from the second data set in response to the natural language query regarding the first data set, the natural language query submitted to the natural language query answering system; and
generate a display including the processed data from the second data set.

12. A non-transitory tangible computer readable storage medium according to claim 9, having stored thereon machine executable instructions, the machine executable instructions, when executed by one or machines, to cause the natural language query answering system to analyze data in the database comprising categorized entities in response to natural language queries.

13. A non-transitory tangible computer readable storage medium according to claim 9, having stored thereon machine executable instructions, the machine executable instructions, when executed by one or machines, to modify the content data items at least in part by associating keywords with the content data items, the keywords indicating to the natural language query answering system how the content data items are to be interpreted.

14. A system, comprising:
a natural language query answering system implemented by one or more computer processors, the one or more computer processors including an external data pre-processor, wherein the external data pre-processor is configured to:
  i) analyze content data items in a first data set, the first data set received via a communication network, to identify content data items in the first data set that correspond to entities in a database comprising categorized entities,
  ii) generate a second data set corresponding to the first data set and based on the analysis of the content data items in the first data set, wherein the second data set is generated to include the content data items modified to indicate how the content data items are to be interpreted by the natural language query answering system,
  iii) transmit, via the communication network, an indication of how data in the first data set will be interpreted by the natural language query answering system, and
  iv) receive, via the communication network and responsive to the indication of how data in the first data set is to be interpreted by the natural language query answering system, modified information in the second data set indicating how data in the first data set is to be interpreted by the natural language query answering system; and
wherein the natural language query answering system is configured to analyze the second data set to facilitate analysis of a natural language query regarding the first data set using the natural language query answering system, and output results of the analysis, including analyzing the modified content items with the natural language query answering system.

15. A system according to claim 14, wherein the external data pre-processor is configured to:
  transmit, via the communication network, an indication of how data in the first data set will be interpreted by the natural language query answering system; and
  receive, via the communication network and responsive to the indication of how data in the first data set is to be interpreted by the natural language query answering system, modified information in the second data set indicating how data in the first data set is to be interpreted by the natural language query answering system.

16. A system according to claim 14, wherein the natural language query answering system is configured to:
  retrieve data from the second data set in response to the query regarding the first data set, the query received via the communication network;
  generate display data, the display data, when displayed on a display device, displaying the data retrieved from the second data set; and
  transmit the display data via the communication network.

17. A system according to claim 14, wherein the natural language query answering system is configured to:
  process data from the second data set in response to the query regarding the first data set, the query received via the communication network;
  generate display data, the display data, when displayed on a display device, displaying the processed data from the second data set; and
  transmit the display data via the communication network.

18. A system according to claim 14, wherein the natural language query answering system is configured to analyze data in the database comprising categorized entities in response to natural language queries.

19. A system according to claim 14, further comprising the database that stores categorized entities.

20. A system according to claim 19, wherein the external data pre-processor is configured to store the second data set in the database that stores categorized entities.

21. A system according to claim 14, wherein the external data pre-processor is configured to store the second data set in another database different than the database that stores categorized entities;
  wherein the system further comprises the other database.

22. A system according to claim 21, further comprising the database that stores categorized entities.

23. A system according to claim 14, wherein the external data pre-processor is configured to modify the content data items at least in part by associating keywords with the content data items, the keywords indicating to the natural language query answering system how the content data items are to be interpreted.

* * * * *